United States Patent
Cook et al.

(10) Patent No.: US 8,787,112 B2
(45) Date of Patent: Jul. 22, 2014

(54) SEISMIC DATA APPARATUS AND METHODS

(75) Inventors: David M Cook, Corvallis, OR (US); Ran-Fun Chiu, Los Altos, CA (US)

(73) Assignee: Shell Oil Company, Houston, TX (US)

( * ) Notice: Subject to any disclaimer, the term of this patent is extended or adjusted under 35 U.S.C. 154(b) by 708 days.

(21) Appl. No.: 12/958,158

(22) Filed: Dec. 1, 2010

(65) Prior Publication Data

US 2012/0140594 A1    Jun. 7, 2012

(51) Int. Cl.
*G01V 1/36* (2006.01)
*G01V 1/28* (2006.01)

(52) U.S. Cl.
USPC .................. 367/42; 367/55; 367/63

(58) Field of Classification Search
USPC ............... 367/42, 55, 60, 63, 76, 77
See application file for complete search history.

(56) References Cited

U.S. PATENT DOCUMENTS

| | | | | |
|---|---|---|---|---|
| 6,002,640 A * | 12/1999 | Harmon | | 367/38 |
| 6,226,601 B1 * | 5/2001 | Longaker | | 702/79 |
| 6,990,045 B2 * | 1/2006 | Jackson | | 367/81 |
| 7,558,157 B1 * | 7/2009 | Gardner et al. | | 368/10 |
| 7,773,457 B2 * | 8/2010 | Crice et al. | | 367/80 |
| 7,885,143 B2 * | 2/2011 | Laycock | | 367/56 |
| 8,228,757 B2 * | 7/2012 | Beffa et al. | | 367/50 |
| 8,254,207 B2 * | 8/2012 | Nemeth et al. | | 367/76 |
| 2004/0252585 A1 * | 12/2004 | Smith et al. | | 367/66 |
| 2005/0047275 A1 * | 3/2005 | Chamberlain et al. | | 367/56 |
| 2011/0216658 A1 * | 9/2011 | Etkin et al. | | 370/242 |

* cited by examiner

*Primary Examiner* — Ian J Lobo

(57) ABSTRACT

Methods and apparatus are provided related to seismic sensor data. Seismic sensor signaling is digitally sampled in accordance with a local clock and without synchronization to standardized time. Timestamp data is used to synthesize data correspondent to an artificial stimulus waveform. Cross-correlation of the synthesized data with the seismic sensor data yields a correlation result. The correlation result can be scaled to an original starting time for the seismic data sampling. The scaled correlation result can be stored in computer-accessible media and subject to further processing or interpretation.

9 Claims, 5 Drawing Sheets

SEISMIC DATA APPARATUS AND METHODS

BACKGROUND

Artificially generated seismic data is used in various endeavors such as oil exploration, study of plate tectonics, and so on. A vast plurality of seismic sensors is hardwired to a data acquisition hub. Seismic stimuli are generated by mechanical means and the resulting detected signals are provided in real time to the hub. Data from the respective seismic sensors is readily synchronized due to the centralized, real-time mode of acquisition.

However, such hardwired systems are expensive and time consuming because a land surface region of interest is often on the order of many square kilometers. The cost of the required cabling and the logistics of field deployment are significant drawbacks. The present teachings address the foregoing and other concerns.

BRIEF DESCRIPTION OF THE DRAWINGS

The present embodiments will now be described, by way of example, with reference to the accompanying drawings, in which.

DETAILED DESCRIPTION

Introduction

Figure 1:
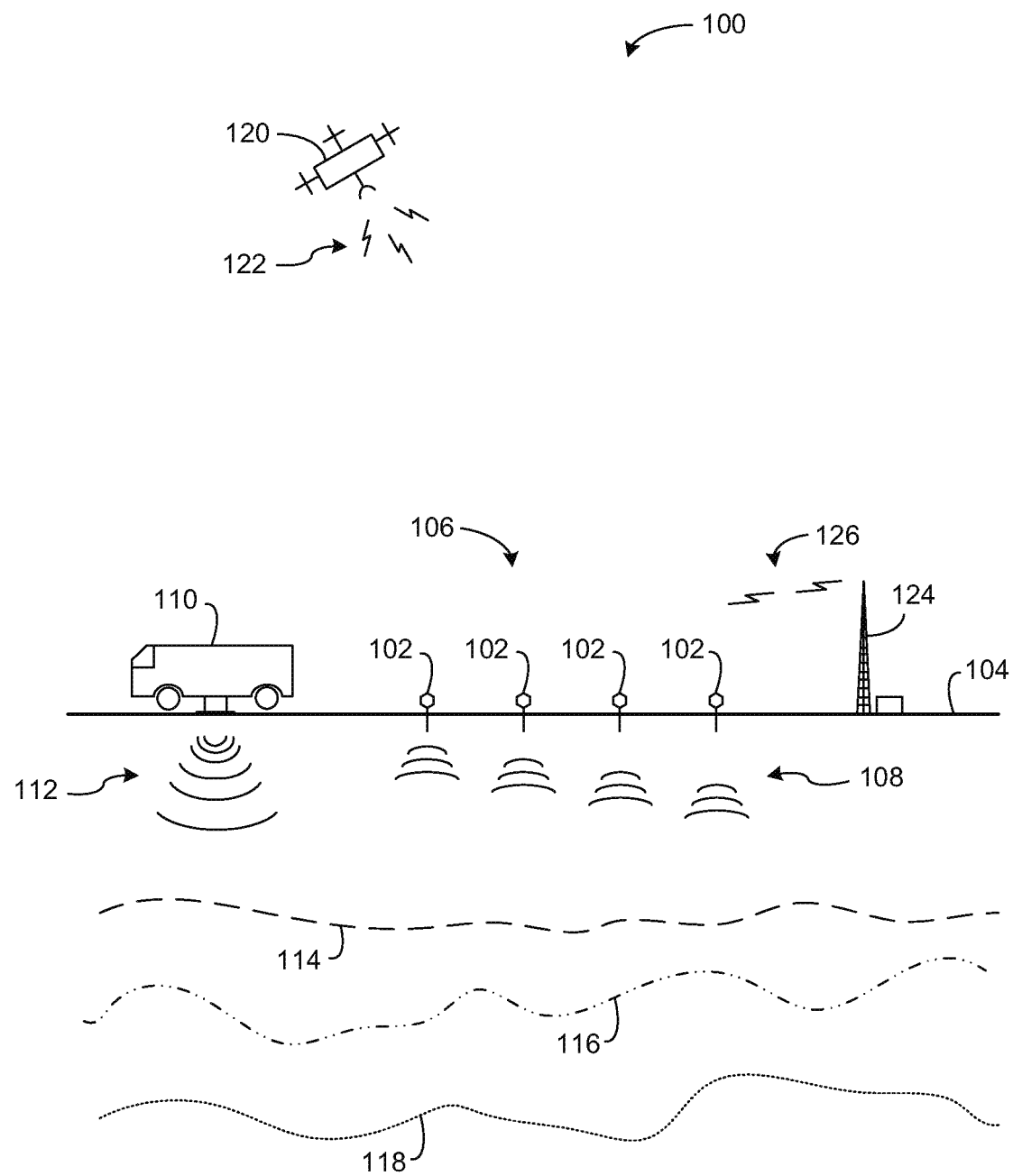
FIG. 1 is schematic view depicting a system according to one example.

Methods and apparatus are provided related to seismic sensor data. Seismic sensor signaling is digitally sampled in accordance with a local clock and without synchronization to standardized time or another entity or entities. Timestamp data is also recorded and thereafter used to synthesize data correspondent to an artificial stimulus waveform. Cross-correlation of the synthesized data with the seismic sensor data yields a correlation result. The correlation result can be scaled to an original starting time for the seismic data sampling. The scaled correlation result can be stored in computer-accessible media and subject to further processing or interpretation.

In one embodiment, a method is performed using one or more computers. The method includes analyzing one or more timestamps to determine a data sampling frequency and an offset time. The method also includes synthesizing pilot sweep data according to the data sample frequency. The synthesized sweep data is characterized by one or more parameters of an artificial seismic stimulus waveform. The method further includes cross-correlating seismic sensor data with the synthesized sweep data so as to derive a correlation result. The method also includes scaling the correlation result to an original starting time using the offset time so as to derive a scaled correlation result.

In another embodiment, an apparatus includes a data storage media and a sensor. The sensor is configured to provide signals corresponding to seismic energy incident to the sensor. The apparatus also includes a clock configured to provide local time values. The apparatus also includes wireless resources that are configured to receive standardized time values from a remote source. The apparatus further includes a controller configured to generate timestamps. Each timestamp includes one of the local time values and one of the standardized time values. The controller is also configured to derive seismic data from the signals. The controller is further configured to store the seismic data and the timestamps by way of the data storage media.

In still another embodiment, a system includes a source configured to provide seismic stimuli as respective frequency modulated energy sweeps. The system also includes one or more field sensors configured to store seismic data corresponding to incident energy originating from the source. Each field sensor is also configured to store timestamps. Each timestamp includes a local time value from an onboard clock and a standardized time value received from a remote source. The system further includes one or more computers configured to derive a cross-correlation result using the seismic data and the timestamps.

In yet another embodiment, a storage media includes a computer-readable program code. The program code is configured to cause one or more processors to analyze one or more timestamps to determine an original starting time for a data set, and to calculate a sample frequency using the one or more timestamps. The program code is further configured to cause the one or more processors to synthesize sweep data according to the sample frequency. The synthesized sweep data is correspondent to an artificial seismic stimulus waveform. The program code is also configured to cause the one or more processors to cross-correlate the data set with the synthesized sweep data to derive a correlation result. The program code is also configured to cause the one or more processors to scale the correlation result to the original starting time to derive a scaled correlation result.

First Illustrative System

Reference is now directed to FIG. 1, which depicts a diagrammatic view of system 100. The system 100 is illustrative and non-limiting with respect to the present teachings. Thus, other apparatuses, devices or systems can be configured and/or operated in accordance with the present teachings.

The system 100 includes a plurality of seismic sensor devices 102. The respective devices 102 are distributed over a land surface 104 such that a sensor array 106 is defined. Each seismic sensor device 102 is configured to sense or detect incident seismic energy 108 and to digitally quantify corresponding seismic data. In one example, each device 102 samples the incident seismic energy 108 at a rate of five-hundred times per second. Other digital sampling rates can also be used. Each device 102 includes an onboard local clock configured to provide a local clock time value. Each device 102 is further configured to store the seismic data and respective timestamps on an ongoing basis. Further details regarding the seismic data and the timestamps are described hereinafter.

The system 100 also includes a source of artificial seismic energy 110. As depicted, the source 110 is embodied as a truck or land vehicle having electro-mechanical resources configured to produce an outgoing seismic stimulus 112. In one example, the artificially generated seismic stimulus 112 is defined by a controlled energy sweep from a lower frequency to an upper frequency. In one illustrative example, a seismic stimulus 112 is frequency-modulated to transition linearly from ten Hertz (i.e., cycles per second) to one-hundred Hertz over a time period of ten seconds. Other seismic stimuli 112 in accordance with other schema can also be used. The waveform model used to drive such a seismic stimulus 112 event is referred to herein as a "pilot sweep" or "pilot chirp". Additional description of such a pilot chirp waveform is provided below.

Generally and without limitation, the outgoing seismic stimulus 112 is reflected and refracted by way of various subterranean strata and features 114, 116 and 118. The reflected and/or refracted energy results in seismic energy 108 incident to the respective devices 102. The precious definition or constituency of such features 114-118 is not germane to an understanding of the present teachings. One having ordinary skill in the geosciences and related arts can appreciate the nature and significance of such seismic energy 108 and further elaboration is not needed for purposes herein.

The system 100 further includes a global positioning system (GPS) satellite 120. The satellite 120 is illustrative of any of a plurality of such GPS satellites in Earth orbit. The satellite 120 provides standardized time values by way of wireless signaling 122. As used herein, the term "standardized time value" refers to a time value provided by, or traceable to, a national or international standards entity such as an atomic clock or other resource. Some or all of the seismic sensor devices 102 are configured to receive standardized time values by way of the wireless signaling 122. The corresponding devices 102 perform such time value reception periodically, in response to a predefined event, or in accordance with another suitable scheme. In one non-limiting example, each seismic sensor device 102 is configured to acquire a standardized time value by way of the signaling 122 at one minute intervals as determined by the onboard local clock.

The system 100 also includes a ground-based source 124 of standardized time values by way of wireless signaling 126. The source 124 can be defined by or include any suitable resources such as, for non-limiting example, an Internet based-time source, a shortwave radio based-time source, and so on. Other suitable sources 124 of standardized time values can also be used. Some or all of the seismic sensor devices 102 are configured to receive standardized time values by way of the wireless signaling 126. The corresponding devices 102 perform such corresponding time value reception in accordance with any suitable scheme. In one non-limiting example, each seismic sensor device 102 is configured to acquire a standardized time value by way of the signaling 126 at one minute intervals as determined by the onboard local clock. Normal illustrative operations of the system 100 are described in detail below.

First Illustrative Apparatus

Figure 2:
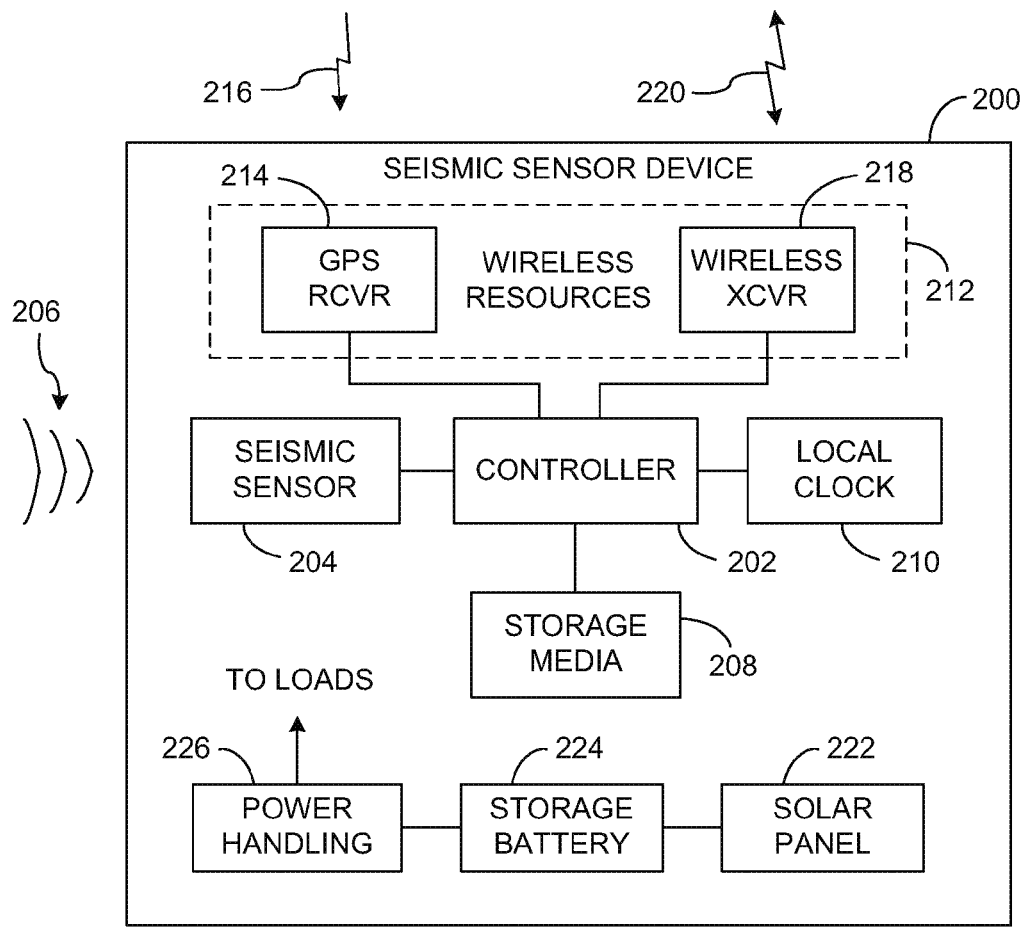
FIG. 2 is a block diagram depicting a seismic sensor device according to another example.

Attention is now given to FIG. 2, which depicts a block diagram of a seismic sensor device 200. The device 200 is illustrative and non-limiting with respect to the present teachings. Thus, other apparatuses, devices or systems can be configured and/or operated in accordance with the present teachings. In one example, each seismic sensor device 102 is substantially defined by the device 200.

The device 200 includes a controller 202. The controller 202 is configured to control various normal operations of the device 200. The controller 202 can be defined by or include any suitable resources such as, without limitation, a microprocessor, a microcontroller, a state machine, an application specific integrated circuit (ASIC), digital or analog or hybrid circuitry, and so on. The particular constituency of the controller 202 can be suitably selected by one having ordinary skill in the electrical and related arts. In one example, the controller 202 is configured to operate in accordance with a computer-readable program code.

The device 200 also includes a seismic sensor 204 configured to provide an electronic signal correspondent to seismic energy 206 incident thereto. The electronic signaling is coupled from the sensor 204 to the controller 202. In turn, the controller 202 is configured to digitally quantify the signals and to store the resulting seismic data within a data storage media 208. The storage media 208 can include any suitable computer-accessible data storage such as non-volatile memory, solid-state memory, magnetic storage media, optical storage media, and so on. Other types of storage media 208 can also be used.

The device 200 further includes a local clock 210. The local clock is configured to provide a local time value to the controller 202. The local clock 210 can be specifically defined by any suitable electronic circuitry, a dedicated purpose integrated circuit, and so on. The local clock 210 is also configured to be reset or resynchronized from time to time by way of the controller 202. In one example, the local clock 210 is defined by a crystal-based electronic clock circuit. Other suitable clocks can also be used.

The seismic sensor device 200 also includes wireless resources 212. The wireless resources 212 include a global positioning system (GPS) receiver 214 configured to receive standardize time values by way of wireless signals 216. The wireless resources 212 also include a wireless transceiver 218 configured to perform bidirectional communication between the device 200 and various external entities by way of wireless signals 220. Non-limiting examples of the wireless signals 220 include infrared, visible spectrum, radio, and so on. Other wireless communications schemes can also be used.

In one example, the controller 202 is configured to receive or acquire standardized time values by way of the GPS receiver 214. In another example, the controller 202 acquires standardized time values by way of the wireless transceiver 218. The controller 202 is further configured to derive or generate timestamps each including a local time value provided by the local clock 210, and a standardized time value acquired by way of the GPS receiver 214 or the wireless transceiver 218. Such timestamps can be stored to and retrieved from the storage media 208 by the controller 202.

The seismic sensor device 200 further includes (optional) solar or photovoltaic (PV) panel 222. The solar panel 222 is illustrative of various electrical energy generating resources that can be used by devices of the present teachings. The solar panel 222 is configured to generate electrical energy from incident light and to provide that electrical power to a storage battery 224. The device 200 also include power handling circuitry 226 configured to receive electrical energy from the storage battery 224 and to provide conditioned or regulated power to the various resources and circuits of the device 200. Non-limiting examples of operations performed by the power handling 226 include voltage regulation, current limiting, and so on.

The seismic sensor device 200 is illustrative of various embodiments contemplated by the present teachings. In general, and without limitation, seismic sensor devices are contemplated that can be distributed over a land surface area such that a sensing array is defined. Each sensor device (e.g., device 200) operates autonomously and without hardwired connection to a central data acquisition hub.

Rather, each sensor device senses incident seismic energy and stores corresponding seismic data via onboard storage media. Such seismic data storage is performed at regular intervals in accordance with an onboard local clock. Additionally, each sensor device periodically acquires a standardized time value from a remote source such as GPS, a wireless Internet resource, and so on. This standardized time value is combined or bundled with a local clock time value to define a timestamp, and the timestamp is stored within the storage media. The storage of the seismic data and the respective timestamps is performed asynchronously. That is, each seismic data storage operation or "write cycle" is not necessarily accompanied by, or contemporaneous with the storage of, a corresponding timestamp.

The stored seismic data and timestamps are later retrieved from the storage media and communicated to an entity distinct from the seismic sensor device by wired, wireless, or other signaling. The onboard storage media within the device can then be erased, written over, or otherwise reused. In this way, a vast array of seismic sensor devices can be deployed for field operation without interconnecting wiring for electrical power, data acquisition or time clock synchronization.

Second Illustrative System

Figure 3:
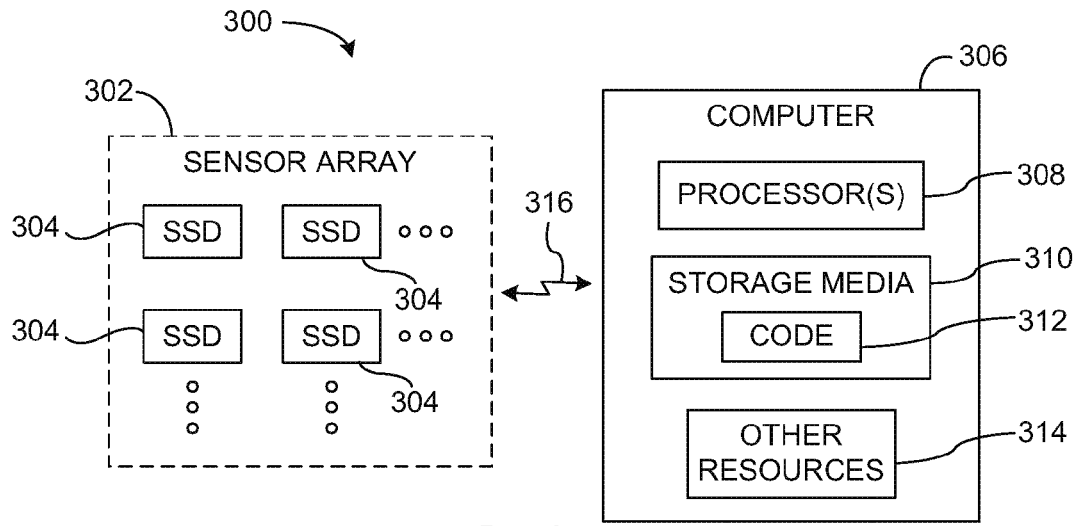
FIG. 3 is a block diagram depicting a system according to another example.

Attention is now given to FIG. 3, which depicts a block diagrammatic view of system 300. The system 300 is illustrative and non-limiting with respect to the present teachings. Thus, other apparatuses, devices or systems can be configured and/or operated in accordance with the present teachings.

The system 300 includes an array 302 of plural seismic sensor devices 304. Each seismic sensor device 304 can be respectfully defined by any such device in accordance with the present teachings. In one example, some or all of the devices 304 are defined by the seismic sensor device 200. The devices 304 of the array are understood to be distributed over a land surface area or region of interest such that each device 304 operates in an autonomous and non-interconnected manner with respect to the other devices 304. The array 302 depicts four devices 304 in the interest of clarity. However, it is to be understood that the array 302 or any other array according to the present teachings can include any suitable number of seismic sensor devices 304.

The system 300 also includes a computer 306. The computer 306 includes one or more processors 308 configured to operate in accordance with a computer-readable program code. The computer 306 also includes storage media 310 including a program code 312 executable by the one or more processors 308. The storage media 310 can be defined by or include non-volatile memory, solid-state storage, optical storage media, magnetic storage media, and so on. Other suitable forms of storage media 310 can also be used.

The computer 306 further includes other resources 314. Other resources 314 can include any other circuitry, hardware or resources suitable for normal operation of the computer 306. Non-limiting examples of such other resources 314 include a user interface, mouse, keyboard, display screen, power supply, wireless communications resources, network communications resources, and so on. One having ordinary skill in the computer and related arts will appreciate that the specific constituency of the other resources 314 is selective, variable and not germane to an understanding of the present teachings.

During normal illustrative operations, the respective seismic sensor devices 304 of the array 302 store seismic data and timestamps within their own internal storage media. The devices 304 communicate their stored seismic data and timestamps to the computer 306 by way of wireless signaling 316. In another example, wired or other signaling is used. The computer 306 then processes the received seismic data and timestamps in accordance with program code 312 stored within storage media 310. Detail description of the processing performed on the seismic data and the timestamps is provided hereinafter.

First Illustrative Data Operations

Figure 4A:
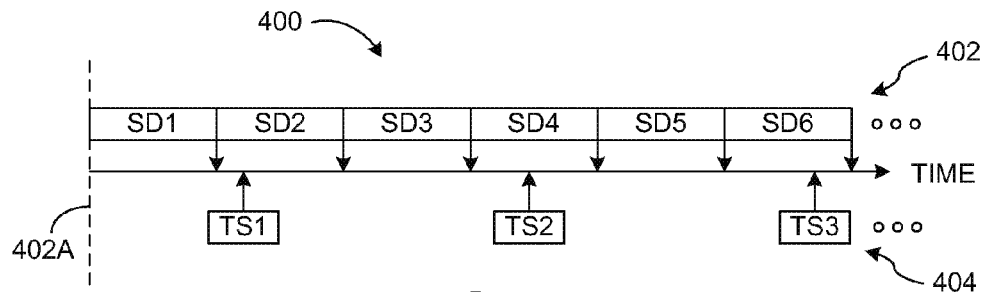
FIG. 4A is a timing diagram depicting a data storage process according to one example.

Attention is now directed to FIG. 4A, which depicts a timing diagram 400 of a data storage operation according to the present teachings. The operation of the timing diagram 400 is illustrative and non-limiting in nature. Thus, other data storage operations proceeding in accordance with other schema are contemplated by the present teachings.

The timing diagram 400 includes a seismic data storage sequence 402. The sequence 402 includes respective seismic data portions SD1, SD2, SD3, SD4. SD5 and SD6, respectively. Each seismic data portion SD1-SD6 includes one or more bytes of information derived by digitally sampling signals provided by a seismic sensor (e.g., 204). Additionally, each seismic data portion SD1-SD6 can be defined by or correspond to one or more seismic data samplings.

Such digital sampling is performed at a frequency determined or regulated by a local clock (e.g., 210). The seismic data portion SD1-5D6 are stored or written in order to storage media (e.g., 208) onboard a seismic sensor device (e.g., 200) of the present teachings. The seismic data portions SD1-5D6 collectively define a seismic data set. A total of six seismic data portions SD1-SD6 are depicted in the interest of clarity. However, the present teachings contemplate seismic data sets inclusive of any number of data portions.

The storage operations or "write cycles" can be—but are not necessarily—performed at regular intervals. In one example, the seismic data portions SD1-SD6 are written at intervals of one second. Other storage intervals or data storage cycling schema can also be used. The seismic data set of the sequence 402 begins at an original starting time 402A.

The timing diagram 400 also includes a timestamp storage sequence 404. The sequence 404 includes respective timestamps TS1, TS2 and TS3 being stored (written) in order to storage media of the seismic sensor device of the present example. Each timestamp TS1-TS3 includes a local time value from a local clock (e.g., 210) and a standardized time value received from a remote source (e.g., 120 or 124). The timestamps TS1-TS3 can be stored at regular intervals. Other storage cycles or schema can also be used.

It is noted that the storage of the seismic data portions SD1-SD6 is asynchronous with the storage of the timestamps TS1-T83. That is, the storage of the seismic data is not synchronized with or determined by the storage of the respective timestamps. As such, seismic energy is sensed and quantified in an essentially continuous and ongoing manner, and the corresponding seismic data is written to storage media at regular intervals. In contrast, timestamps are generated and stored from time-to-time as discrete data points.

Figure 4B:
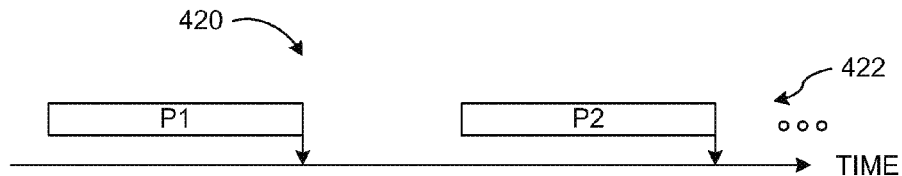
FIG. 4B is timing diagram depicting a data storage process according to another example.

Attention is now directed to FIG. 4B, which depicts a timing diagram 420 of a data storage operation according to the present teachings. The operation of the timing diagram 420 is illustrative and non-limiting in nature. Thus, other data storage operations proceeding in accordance with other schema are contemplated by the present teachings.

The timing diagram 420 includes a pilot sweep or "chirp" storage sequence 422. The sequence 422 includes pilot sweeps P1 and P2, respectively. Each pilot sweep P1-P2 includes digital data derived by sampling a frequency-modulated waveform and/or control signal used to drive an artificially generated seismic stimulus (e.g., 112). Such digital sampling is performed at a frequency determined or regulated by way of standardized time values received from a remote source (e.g., 120, 124).

Each pilot sweep P1-P2 also includes a standardized time value from a remote source (e.g., 120 or 124) corresponding to a beginning time for the generation of a particular seismic stimulus. Additionally, each pilot sweep P1-P2 includes waveform parameter data such as amplitude, initial frequency, terminal frequency, and sweep duration or period. Other pilot sweep waveform parameters can also be included as needed or desired within the pilot sweeps P1-P2.

The pilot sweeps P1-P2 are stored by way of computer-accessible storage media at or coupled to the stimulus source (e.g., 110). The pilot sweeps P1-P2 are retrievable from their storage media for later use in analyzing the seismic data retrieved from the respective seismic sensor devices. It is noted that the pilot sweeps P1-P2 are stored in accordance with the artificial generation of a seismic stimulus, and are not synchronized or coordinated with the detection, quantification or storage of the seismic data or the timestamps at any seismic sensor device.

The digital sampling used to derive each pilot sweep P1-P2 can differ in resolution from that used at any particular seismic sensor device. In one illustrative and non-limiting example, each pilot sweep P1-P2 and seismic data portion SD1-SD6 includes respective digital information sampled at a rate of one-thousand Hertz. Other respective sampling rates can also be used. However, the storage of the seismic data portions SD1-SD6 is asynchronous with (i.e., not determined by or linked to) the storage of the timestamps TS1-TS3, which in turn is asynchronous with the storage of the pilot sweeps P1-P2.

However, it is noted that error or drift in a local clock (e.g., 210) can result in digital sampling of the seismic data at a frequency that is nearly but not equal to the digital sampling frequency of the pilot sweeps. In one illustrative example, the pilot sweeps P1-P2 are digitally sampled at precisely 1000.0 Hertz, while the seismic data portions SD1-SD6 are digitally sampled at 999.987 Hertz—a difference of thirteen parts-per-million.

Such a difference in the respective sampling frequencies (i.e., seismic sensor data vs. pilot sweep data) can cause distorted cross-correlation results when the seismic data is later analyzed. In general, the present teachings contemplate corrective action for such sampling frequency differences by determining the actual sampling frequency of the seismic sensor data, and then synthesizing pilot sweep or "chirp" data at that determined frequency for use in cross-correlation of the two respective data sets.

First Illustrative Method

Figure 5:
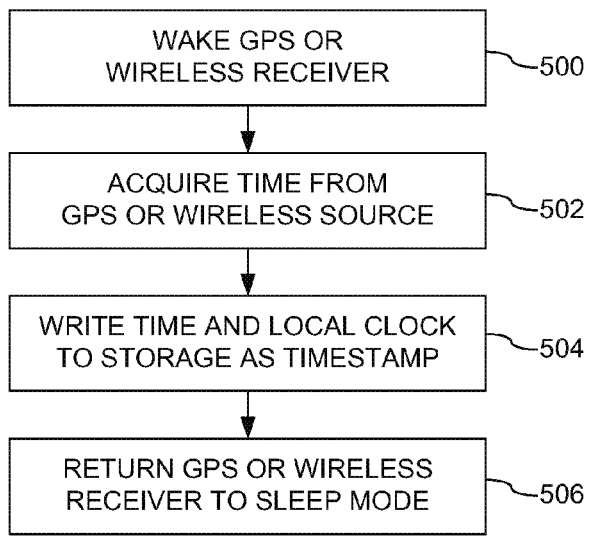
FIG. 5 is a flow diagram depicting a method according to one example.

Attention is now directed to FIG. 5, which depicts a flow diagram of a portion of a method according to an example of the present teachings. The method of FIG. 5 includes particular operations and order of execution. However, other methods including other operations, omitting one or more of the depicted operations, and/or proceeding in other orders of execution can also be used according to the present teachings. Thus, the method of FIG. 5 is illustrative and non-limiting in nature. Reference is also made to FIG. 2 in the interest of understanding the method of FIG. 5.

At 500, a GPS receiver or wireless receiver (or transceiver) is awakened from asleep state. For purposes of illustration, it is assumed that a controller 202 of a device 200 signals either a GPS receiver 214 or a wireless transceiver 218 out of a power conserving "sleep" mode into a functional operating mode.

At 502, a standardized time value is acquired from a GPS or wireless source. For purposes of the present illustration, the GPS receiver 214 or the wireless transceiver 218 is used to acquire a standardized time value by way of wireless signaling 216 or 220, respectively. The standardized time value is received as or converted to a digital data value by the controller 202.

At 504, the standardized time value and a local clock value are written to storage media as a timestamp. For purposes of the present illustration, the controller 202 acquires a local time value from a local clock 210 and combines that value (digital data equivalent) with the standardized time value just acquired at 502 above. The resulting timestamp is then stored in storage media 208 aboard the device 200.

At 506, the GPS receiver or wireless receiver is returned to a sleep mode. In the present illustration, the controller 202 signals the GPS receiver 214 or the wireless transceiver 218 to return to a power conserving sleep mode. In this way, energy resources of the seismic sensor device 200 are conserved during normal operation, while timestamps are generated and stored for later use in seismic data analysis.

Second Illustrative Method

Figure 6:
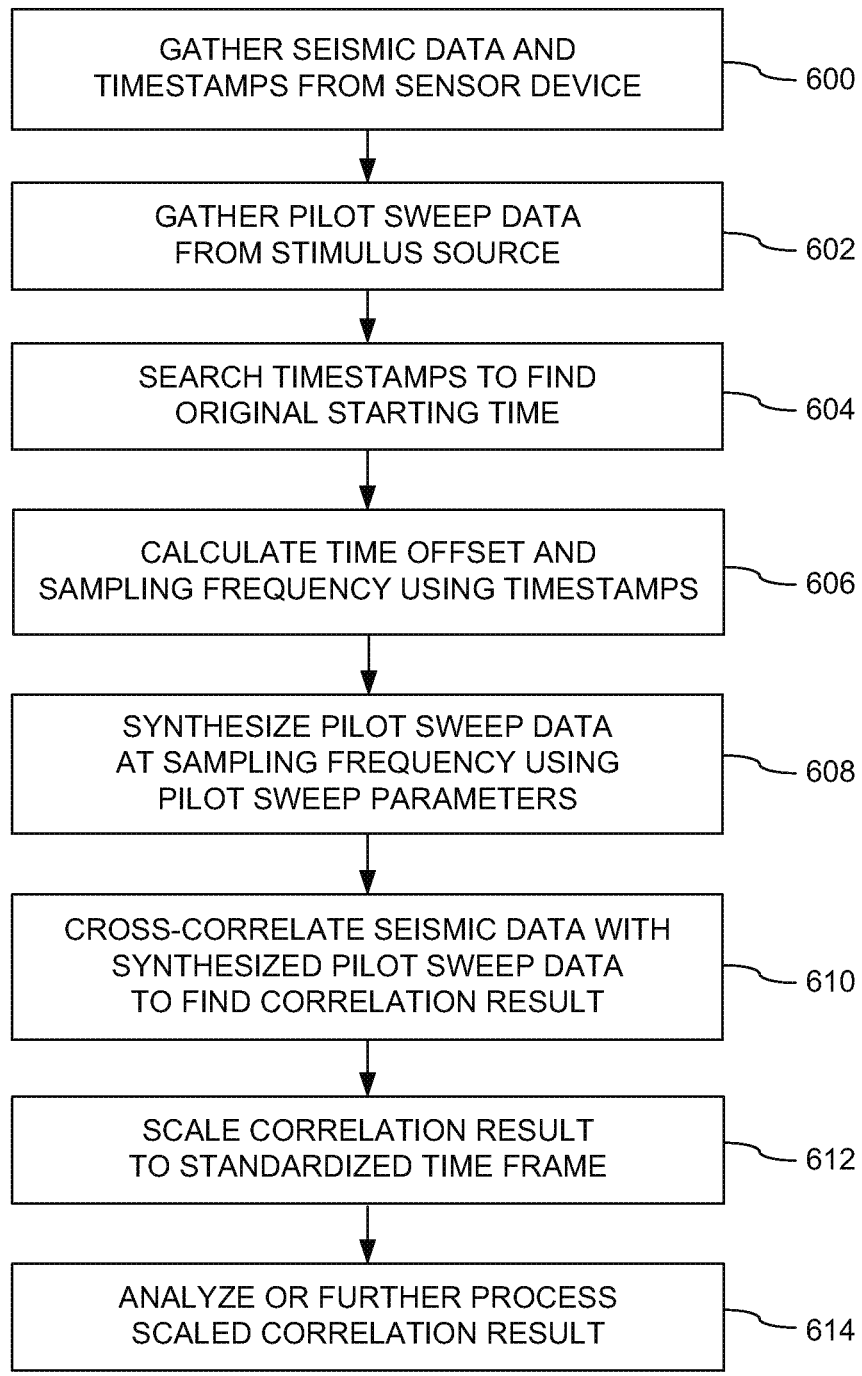
FIG. 6 is a flow diagram depicting a method according to another example.

Attention is now directed to FIG. 6, which depicts a flow diagram of a method according to another embodiment of the present teachings. The method of FIG. 6 includes particular operations and order of execution. However, other methods including other operations, omitting one or more of the depicted operations, and/or proceeding in other orders of execution can also be used according to the present teachings. Thus, the method of FIG. 6 is illustrative and non-limiting in nature. Reference is also made to FIGS. 1-4B in the interest of understanding the method of FIG. 6.

At 600, seismic data and timestamps are gathered from a seismic sensor device. For purposes of illustration, it is assumed that a computer 306 gathers seismic data (e.g., 8O1-SD6) and timestamps (e.g., TS1-TS3) from a seismic sensor device 304 by way of wireless signals 316. Wired or other signaling can also be used. The seismic data and timestamps are stored within storage media 310 of the computer 306. The computer 306 is further understood to operate in accordance with an executable program code 312.

At 602, pilot sweep data is gathered from a from a seismic stimulus source. In the present illustration, the computer 306 gathers pilot sweep data (e.g., P1-P5) from a seismic stimulus source 110. The pilot sweep data is stored within storage media 310 of the computer 306.

At 604, the timestamps are searched to find an original starting time. In the present illustration, the computer 306 searches the timestamps gathered at 600 above to determine an original starting time (e.g., 402A) for the corresponding seismic data.

At 606, a time offset and a sample frequency are calculated using the timestamps. In the present illustration, the computer 306 calculates the sample frequency as the rate at which the seismic data was digitally sampled. The computer 306 also calculates the time offset as a differential between the local time clock values and the standardized time values acquired by the seismic sensor device. In one example, the sample frequency or the time offset—or both—is/are determined by linear regression analysis of the timestamps. Other analytical techniques can also be used.

For example, linear regression of the local clock time values versus the standardized time values provided as corresponding pairs by way of the timestamps, results in the following relationship:

$$Ts = (B_1 * Tl) + B_0 \qquad \text{(Equation 1)}$$

Wherein: Ts=Time value correspondent to a reference standard;
Tl=Time value correspondent to a local clock;
$B_1$=Slope or time scale factor of linear relationship;

$B_0$=Intercept or time offset of linear relationship.

Once linear regression of the timestamps is complete, a corresponding standardized time value can be found for any particular local clock time value by way of Equation 1.

In the present illustration, the seismic data sample frequency is determined to be 999.987 Hertz and is compared to the pilot sweep sampling frequency of 1000.0 Hertz. As such: $B_1$=1000.0/999.987=1.000013. Thus, a frequency difference of thirteen parts-per-million is determined by way of the comparison. Such a frequency difference is sufficient to cause distorted cross-correlation results in subsequent processing. Also in the present illustration, a time offset of twenty-one milliseconds is identified.

At 608, pilot sweep data is synthesized at the sampling frequency using pilot sweep parameters. That is, the synthesized digital data is consistent with the waveform parameters of the original pilot sweep. In the present illustration, the computer 306 synthesizes or generates a data set representing a pilot sweep waveform at a sampling frequency of 999.987 Hertz. In the present illustration, the synthesized pilot sweep data corresponds to a sinusoidal waveform that is frequency modulated from ten Hertz to one-hundred Hertz over a period of ten seconds.

For example, a set of discrete sampling times for use in synthesizing the pilot sweep data can be calculated as follows:

$$Tsn = (B_1 * Tln) + B_0 - T_0 \quad \text{(Equation 2)}$$

Wherein: Tsn=Synthetic standardized time value "n";
Tln=Local clock time value "n";
$B_1$=Slope found via Equation 1;
$B_0$=Time offset found via Equation 1;
$T_0$=Standardized starting time value of source pilot sweep.

Thus, a set of n+1 synthetic time values $Ts_0, Ts_1, Ts_2, \ldots Tsn$ can be found via Equation 2. $T_0$ is the standardized time value of the start of the actual pilot sweep stimulus resulting in the particular seismic data set to be cross-correlated at 610 below. The synthesized pilot sweep data, as a set of discrete values, can then be generated in accordance with:

$$S(t) = A(t) * \text{Sin}(2 * Pi * F_0 * t + Pi * R * t^2) \quad \text{(Equation 3)}$$

Wherein: S(t)=Synthesized sweep value at time "t";
A(t)=Amplitude of synthesized sweep value at time "t";
Sin=Sine function;
Pi=Constant value Pi;
$F_0$=Pilot sweep frequency at time "$T_0$";
R=Time rate-of-change of pilot sweep frequency;
t=Tsn for each of n+1 values.

Optionally, the synthesized data set S(t) can be digitally filtered in accordance with filter characteristics of the corresponding seismic sensor device.

At 610, the actual seismic data is cross-correlated with the synthesized pilot sweep data to find a correlation result. For purposes of the present illustration, the computer 306 cross-correlates the synthesized data set generated at 608 with the real-world seismic data so as to derive a correlation result. One having ordinary skill in the signal processing arts is familiar with cross-correlation by way of the convolution integral and other techniques suitable for computer automation. The correlation result is a discrete data set.

At 612, the correlation result is scaled to the standardized time frame. For purposes of the present illustration, the correlation result data set is analyzed to identify one or more values of interest therein. The respective time values corresponding to the values of interest are then multiplied by the time scale factor $B_1$ as found above. For example, such values of interest can correspond to seismic reflection times and/or magnitudes.

At 614, the scaled correlation result is subject to further analysis, processing or interpretation as needed or desired. In one example, the scaled correlation result is stored in storage media 310 of the computer 306 for later retrieval and use.

Third Illustrative Method

Figure 7:
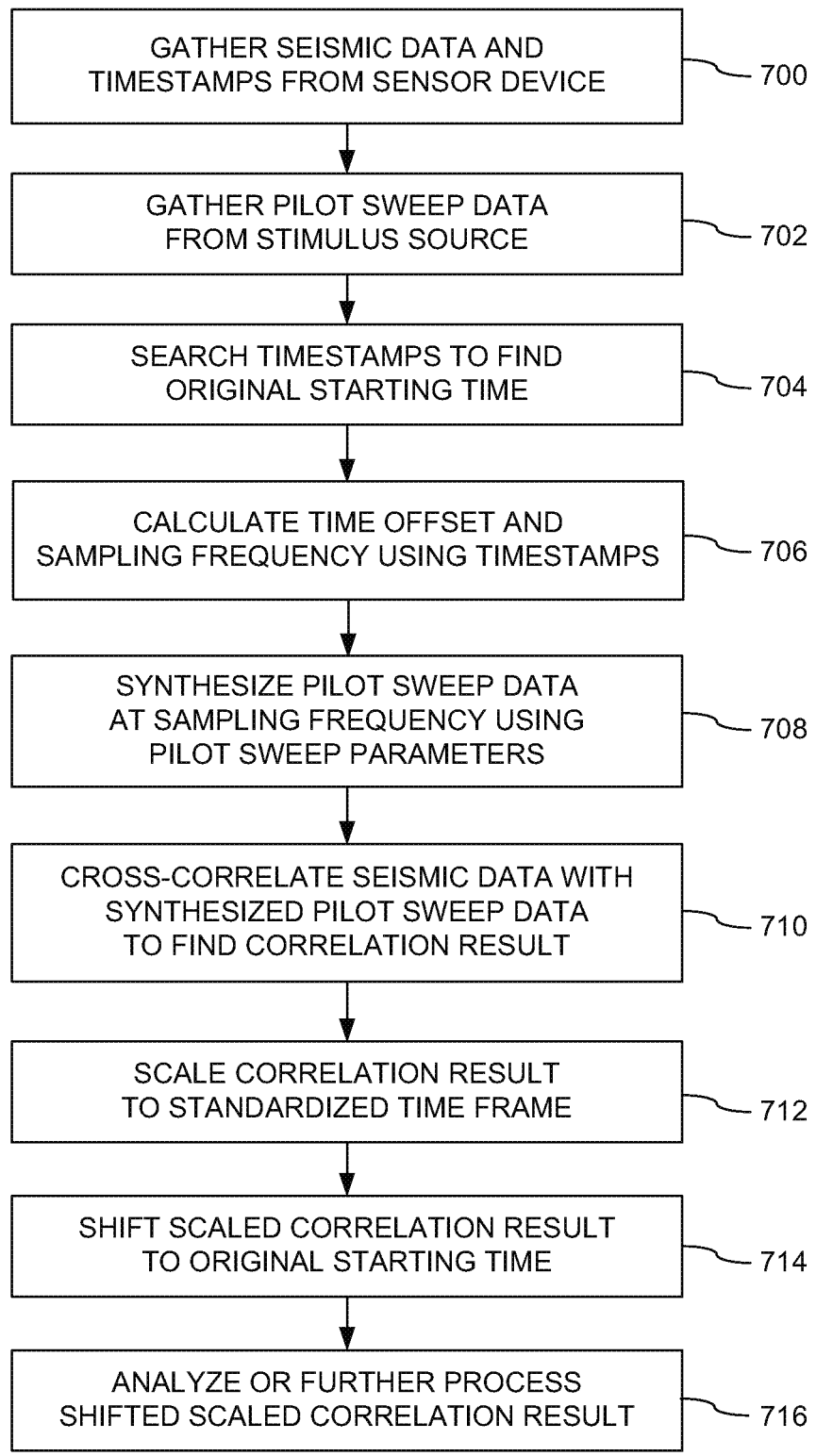
FIG. 7 is a flow diagram depicting a method according to yet another example.

Attention is now directed to FIG. 7, which depicts a flow diagram of a method according to another embodiment of the present teachings. The method of FIG. 7 includes particular operations and order of execution. However, other methods including other operations, omitting one or more of the depicted operations, and/or proceeding in other orders of execution can also be used according to the present teachings. Thus, the method of FIG. 7 is illustrative and non-limiting in nature. Reference is also made to FIGS. 1-4B in the interest of understanding the method of FIG. 7.

At 700, seismic data and timestamps are gathered from a seismic sensor device. For purposes of illustration, it is assumed that a computer 306 gathers seismic data (e.g., SD1-SD6) and timestamps (e.g., TS1-TS3) from a seismic sensor device 304 by way of wireless signals 316. Wired or other signaling can also be used. The seismic data and timestamps are stored within storage media 310 of the computer 306. The computer 306 is further understood to operate in accordance with an executable program code 312.

At 702, pilot sweep data is gathered from a from a seismic stimulus source. In the present illustration, the computer 306 gathers pilot sweep data (e.g., P1-P5) from a seismic stimulus source 110. The pilot sweep data is stored within storage media 310 of the computer 306.

At 704, the timestamps are searched to find an original starting time. In the present illustration, the computer 306 searches the timestamps gathered at 600 above to determine an original starting time (e.g., 402A) for the corresponding seismic data.

At 706, a time offset and a sample frequency are calculated using the timestamps. In the present illustration, the computer 306 calculates the sample frequency as the rate at which the seismic data was digitally sampled. The computer 306 also calculates the time offset as a differential between the local time clock values and the standardized time values acquired by the seismic sensor device. In one example, the sample frequency or the time offset—or both—is/are determined by linear regression analysis of the timestamps. Other analytical techniques can also be used.

In the present illustration, the seismic data sample frequency is determined to be 999.984 Hertz and is compared to the pilot sweep sampling frequency. A frequency difference of sixteen parts-per-million is determined by way of the comparison. Such a frequency difference is sufficient to cause distorted cross-correlation results in subsequent processing. Also in present illustration, a time offset of nineteen milliseconds is identified.

At 708, pilot sweep data is synthesized at the sampling frequency using pilot sweep parameters. That is, the synthesized digital data is consistent with the waveform parameters of the original pilot sweep. In the present illustration, the computer 306 synthesizes or generates a data set representing a pilot sweep waveform at a sampling frequency of 999.984 Hertz. The synthesized pilot sweep data corresponds to a sinusoidal waveform that is frequency modulated from ten Hertz to one-hundred Hertz over a period of ten seconds.

Discrete sampling times for the synthesized pilot sweep data can be calculated in accordance with:

$$t=0, dT, 2dT, 3dT, \ldots, ndT \quad \text{(Equation 4)}$$

Wherein: t=Set of n+1 discrete time values;
dT=$B_1$/Fs;
Fs=Intended seismic sampling frequency in Hertz.

The synthesized pilot sweep data can then be generated in accordance with:

$$S(t) = A(t) * \operatorname{Sin}(2*Pi*F_0*t + Pi*R*t^2) \quad \text{(Equation 5)}$$

Wherein: S(t)=Synthesized sweep value at time "t";
A(t)=Amplitude of synthesized sweep value at time "t";
Sin=Sine function;
Pi=Constant value Pi;
$F_0$=Pilot sweep frequency at a time "$T_0$";
R=Time rate-of-change of pilot sweep frequency;
t=discrete time value for each of n+1 values.

Optionally, the synthesized data set S(t) can be digitally filtered in accordance with filter characteristics of the corresponding seismic sensor device.

At 710, the seismic data is cross-correlated with the synthesized pilot sweep data to find a correlation result. For purposes of the present illustration, the computer 306 cross-correlates the synthesized data set generated at 608 with the seismic data so as to derive a correlation result. Cross-correlation by way of the convolution integral and other techniques suitable for computer automation can be used.

At 712, the correlation result is scaled to the standardized time frame. For purposes of the present illustration, the correlation result data set is analyzed to identify one or more values of interest therein. The respective time values corresponding to the values of interest are then multiplied by the time scale factor $B_1$ as found above. For example, such values of interest can correspond to seismic reflection times and/or magnitudes.

At 714, the correlation result data is shifted in accordance with an original starting time. For purposes of the present illustration, the correlation result is time shifted by adding a value of ($B_0$–$T_0$).

At 716, the scaled correlation result is subject to further analysis, processing or interpretation as needed or desired. In one example, the scaled correlation result is stored in storage media 310 of the computer 306 for later retrieval and use.

Illustrative Pilot Chirp

Figure 8:
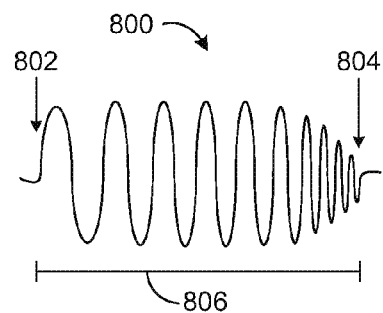
FIG. 8 is a signal diagram depicting a pilot sweep waveform according to another example.

Reference is now made to FIG. 8, which is a signal diagram depicting a pilot sweep or pilot chirp 800 according to another example of the present teachings. The pilot chirp 800 is illustrative and non-limiting with respect to the present teachings. Other pilot chirp or pilot sweeps defined by respectively varying characteristics can also be used. Thus, the pilot chirp 800 is illustrative of any number of waveforms suitable for use in driving an artificial seismic stimulus (e.g., 112) according to the present teachings.

The illustrative pilot chirp (or sweep) 800 is defined by a sinusoidal, frequency-modulated waveform characterized by a first or initial frequency at a time 802 (i.e., $T_0$) and a second or terminal frequency at a time 804. The pilot chirp 800 spans a time period 806 between the time 802 and the time 804. In one example, the initial frequency is ten Hertz at time 802 and the terminal frequency is one-hundred Hertz at time 804 and is increased linearly over a period 806 of ten seconds. Other suitable waveform characteristics can also be used.

The foregoing devices, systems and methods are illustrative of any number of embodiments contemplated by the present teachings. In general, and without limitation, one or more sources of artificial seismic energy are operated in accordance with a pilot chirp or pilot sweep waveform. In one example, the waveform is characterized by a frequency-modulated ramping from a first frequency to a second frequency over a period of time. A plurality of distinct-in-time seismic energy emissions can be generated by repeated use of the pilot chirp waveform.

A plurality of seismic sensor devices is distributed over a geographic area of interest so that a sensor array is defined. Each of the seismic sensor devices operates autonomously and without synchronization with the other devices of the array. Incident seismic energy, originating at the one or more artificial sources, is sensed, quantified and stored as digital data. The seismic data is sampled at regular intervals determined by a local clock of the particular seismic sensor device. Each seismic sensor device also stores timestamps each including a local clock time value and a standardized time value provided by a remote resource. In one or more examples, the sampling and storing of the seismic data is asynchronous with the storing of the timestamps.

Eventually, each seismic sensor device provides its stored seismic data and timestamps to a computer or computerized system for processing. The receiving computer or system analyzes the timestamps to determine an original starting time for the seismic data set. A sampling frequency and an offset time are also determined by analysis of the timestamp data. The system or computer then synthesizes pilot sweep data using the sample frequency and known parameters of the original pilot sweep waveforms. The synthesized pilot sweep data is then cross-correlated with the seismic sensor data to derive a correlation result data set.

The correlation result data set can then be scaled or shifted to correspond to the original starting time as determined from the timestamps. The scaled correlation result is then stored in computer-accessible media. The scaled correlation result can be subjected to other processing or interpretation, and so on.

In general, the foregoing description is intended to be illustrative and not restrictive. Many embodiments and applications other than the examples provided would be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A method performed using one or more computers, comprising:
    analyzing one or more timestamps to determine a data sampling frequency and an offset time;
    synthesizing pilot sweep data according to the data sampling frequency, the synthesized pilot sweep data characterized by one or more parameters of an artificial seismic stimulus waveform; and
    cross-correlating seismic sensor data with the synthesized pilot sweep data to derive a correlation result.

2. The method according to claim 1 further comprising recording the correlation result to a computer-accessible storage media.

3. The method according to claim 1, the one or more timestamps each including a local clock time value and a standardized time value.

4. The method according to claim 3, each local clock time value provided by an onboard clock of a seismic sensor device, each standardized time value provided by a remote time source to a seismic sensor device by way of wireless communication.

5. The method according to claim 1 further comprising scaling the correlation result to an original starting time using the offset time to derive a scaled correlation result.

6. The method according to claim 1 further comprising acquiring at least some of the seismic data and at least some of the timestamps from a seismic sensor device.

7. A system, comprising:
  a source configured to provide seismic stimuli as respective frequency-modulated energy sweeps;
  one or more field sensors configured to store seismic data corresponding to incident energy originating from the source, each field sensor also configured to store timestamps each including a local time value from an onboard clock and a standardized time value received from a remote source; and
  one or more computers configured to derive a cross-correlation result using the seismic data and the timestamps;
  the one or more computers further configured to:
    calculate a sample frequency using the timestamps;
    synthesize sweep data consistent with sample frequency, the synthesized sweep data formatted to emulate a seismic stimulus waveform used by the source; and
    cross-correlate the synthesized sweep data with the seismic data so as to derive the cross-correlation result.

8. The system according to claim 7, each field sensor further configured to:
  store the seismic data at regular intervals in accordance with the onboard clock; and
  store the timestamps asynchronous with the storing of the seismic data.

9. A storage media including a computer-readable program code configured to cause one or more processors to:
  analyze one or more timestamps to determine an original starting time for a data set;
  calculate a sample frequency using the one or more timestamps;
  synthesize sweep data according to the sample frequency, the synthesized sweep data correspondent to an artificial seismic stimulus waveform; and
  cross-correlate the data set with the synthesized sweep data to derive a correlation result.

* * * * *